United States Patent [19]

Steuer et al.

[11] 4,351,569
[45] Sep. 28, 1982

[54] HUB SLEEVE FORMED OF DEEP-DRAWN PARTS

[75] Inventors: Werner Steuer, Schweinfurt; Bernd Leiter, Hergolshausen, both of Fed. Rep. of Germany

[73] Assignee: Fichtel & Sachs AG, Schweinfurt, Fed. Rep. of Germany

[21] Appl. No.: 121,118

[22] Filed: Feb. 13, 1980

[30] Foreign Application Priority Data

Feb. 21, 1979 [DE] Fed. Rep. of Germany ....... 2906627

[51] Int. Cl.³ .............................................. B60B 27/04
[52] U.S. Cl. ................................. 301/6 V; 301/105 B
[58] Field of Search ............ 301/105 R, 105 B, 105 S, 301/6 V; 308/192; 29/159.3

[56] References Cited

U.S. PATENT DOCUMENTS

| 2,798,771 | 7/1957 | Douglas | 301/105 B |
| 2,997,145 | 8/1961 | Ross | 301/105 B |
| 3,072,424 | 1/1963 | Mayne et al. | 301/105 R |
| 4,256,348 | 3/1981 | Lester et al. | 301/63 R X |

FOREIGN PATENT DOCUMENTS

| 576128 | 1/1924 | France | 301/105 B |
| 255849 | 11/1927 | Italy | 301/105 B |
| 594169 | 11/1947 | United Kingdom | 301/105 B |

*Primary Examiner*—Charles A. Marmor
*Attorney, Agent, or Firm*—Toren, McGeady & Stanger

[57] ABSTRACT

A hub for a bicycle or the like consists of two coaxial sleeve members secured together against relative axial and rotational movement. Each sleeve has an outwardly extending spoke flange disposed transversely of the hub axis. One sleeve member is cylindrically shaped and has an axial length approximately the same as the hub. The other sleeve member is cup-shaped and fits over one end of the cylindrical-shaped sleeve member. The two sleeve members are deep-drawn parts. The sleeve members can be secured together in various ways such as mechanical interconnection, welding or by an adhesive material.

12 Claims, 10 Drawing Figures

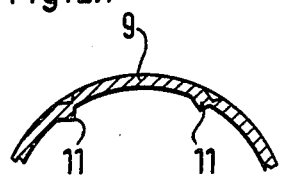
Fig. 2.1
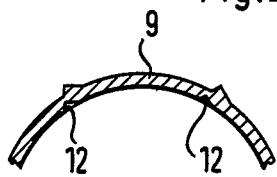
Fig. 2.2
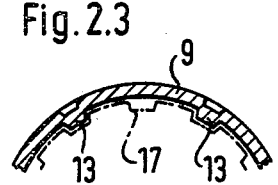
Fig. 2.3
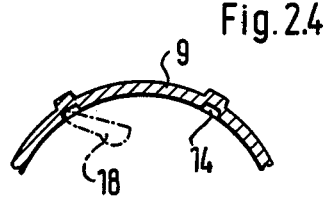
Fig. 2.4
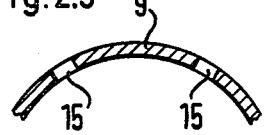
Fig. 2.5

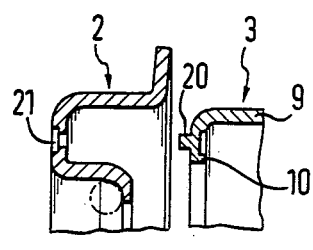
Fig. 3.1
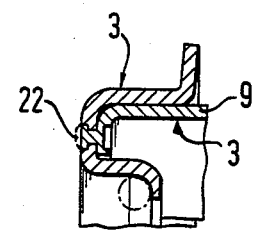
Fig. 3.2
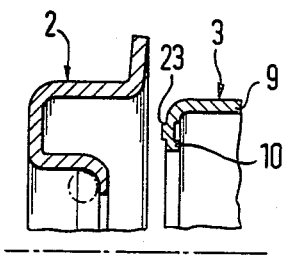
Fig. 3.3
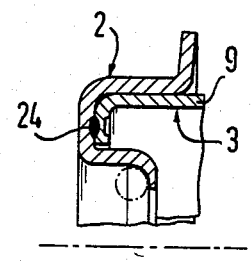
Fig. 3.4

HUB SLEEVE FORMED OF DEEP-DRAWN PARTS

SUMMARY OF THE INVENTION

The present invention is directed to a hub for bicycles or the like and includes a hub sleeve body for receiving at least the structural components used for the driving operation, with the sleeve body being formed by two coaxially arranged interconnected sleeve members each manufactured separately as a deep-drawn part.

There is a known hub for bicycles or the like which is constructed as a back-pedalling hub and the hub sleeve is assembled from two parts each of which is a drawn component. The mechanisms for driving and for braking are provided in one of the two hub parts. The shape of the sleeve walls are adapted to the internal elements of the hub and each of the sleeve parts forms a spoke flange of the same diameter as the other. This known hub sleeve has impressed or embossed portions for non-rotatably holding the parts of a multiple disk brake and the sleeve has means for non-rotatable engagement with assembly elements. The hub sleeve, however, is not suitable for use as a multiple-speed hub because the connecting point of the two sleeve parts is located axially approximately in the center of the sleeve and its diameter is significantly reduced with the result that the accommodation of the gear assembly element for a multiple-speed hub is impaired.

Therefore, the primary object of the present invention is to provide a hub which can accommodate even complicated hub gear assemblies, particularly multiple-speed hub assemblies, and, at the same time, can be assembled from deep-drawn parts which are easy to produce and assemble.

In accordance with the present invention, a first sleeve member is provided with a spoke flange and is constructed in the shape of a cylinder extending for about the full axial length of the hub with the second sleeve part being approximately cup-shaped and fitted over one end of the cylindrically shaped sleeve part.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIGS. 2.1-2.5 are partial transverse cross sections of the hub sleeve illustrating different embodiments of the inner surface of the sleeve hub;

FIGS. 3.1-3.2 illustrate in cross section a portion of the sleeve members forming the hub sleeve illustrating the interconnection of the sleeve members; and FIGS. 3.3 and 3.4 illustrate in section a portion of the hub sleeve indicating another embodiment of the connection between the sleeve members forming the hub sleeve.

DETAILED DESCRIPTION OF THE INVENTION

Figure 1:
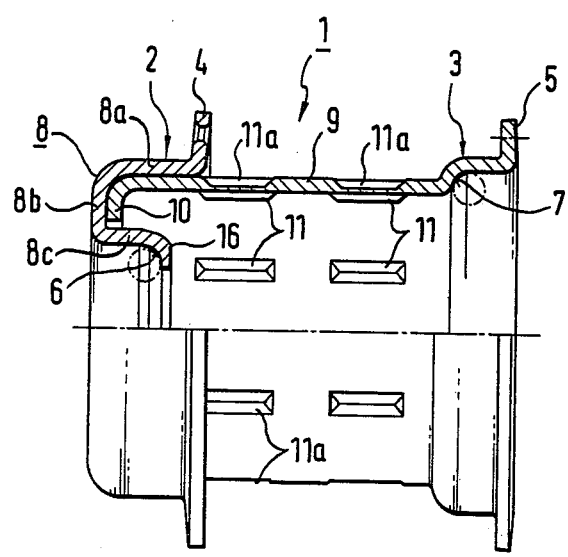
FIG. 1 is a side view partly in axial section of a hub sleeve formed of deep-drawn sheet metal parts.

In FIG. 1 a hub sleeve 1 for a bicycle or the like is made up of two individual parts. The two individual parts are an approximately cup-shaped hub sleeve member 2 and a cylindrically shaped sleeve member 3. The sleeve members 2, 3 are arranged coaxially and one end of the sleeve member 3 fits into the sleeve member 2 and they are interconnected so that one cannot rotate relative to the other. Both of the sleeve members 2, 3 are formed of sheet metal and are produced as deep-drawn parts. Each of the sleeve members has a spoke flange 4, 5 formed thereon and extending radially outwardly transversely of the axial direction of the hub sleeve 1. The spoke flanges each have the same diameter. Each sleeve member 2, 3 has a formed roller bearing race 6, 7 and the bearing races are spaced apart in the axial direction of the hub sleeve. As mentioned above, the sleeve members 2 and 3 are connected together in a non-rotatable manner as will be explained in detail with regard to FIGS. 3.1-3.4.

Hub member 3 as shown in FIG. 1, has a cylindrical portion which extends for approximately the full axial length of the hub sleeve 1. The inside diameter of sleeve member 3 is sufficiently large to receive the internal components of the hub, not shown, when the hub sleeve, in accordance with the present invention, is used for a multiple-speed gear assembly hub. The axle for the hub is not shown in the drawing, because it does not form a part of the invention.

In its cylindrical portion 9, the sleeve member 3 has a number of radially inwardly directed projections 11 arranged in two axially spaced rows about its inner circumference. These projections act as entrainment means to provide an operative connection with coupling means of the fully assembled hub. These projections 11 may be pressed or stamped in. Furthermore, other shapes or arrangements of the projections can be used, as is illustrated in FIGS. 2.2-2.5. In FIG. 2.1 the formation of the projections 11, as shown in FIG. 1, are illustrated in more detail. It can be seen that the radially inner portion of the projections extend linearly. Since the projections 11 extend radially inwardly, due to the manner in which the sleeve member is deformed, indented portions 11a are provided on the outer circumference of the cylindrical portion of the sleeve member, note FIG. 1. In contrast, FIG. 2.2 shows a somewhat opposite arrangement to that in FIG. 2.1 with the indentations 12 formed in the inner surface of the cylindrical portion 9 and with projections extending outwardly from the outer circumferential surface of the cylindrical portion. The base of the indentations 12 extend linearly in the axial direction of the hub sleeve. These indentations afford the point of engagement of corresponding coupling means for the gear assembly elements in the interior of the hub sleeve, these coupling means are not shown.

In FIG. 2.3 another embodiment of the cylindrical portion 9 is shown with inwardly projecting protuberances 13 spaced apart in the circumferential direction of the cylindrical portion. In profile, these protuberances are approximately rectangular and are especially advantageous for continuous engagement with a ring 17 forming outwardly extending teeth for the drive elements of the gear assembly hub. The ring and its teeth are shown in dot-dash lines.

FIG. 2.4 displays yet another embodiment of the cylindrical portion 9 of the sleeve member 3 with recesses 14 formed in the inner surface of the cylindrical portion and corresponding outwardly directed protuberances on the outer surface of the cylindrical portion.

The recesses 14 are particularly suitable for temporary engagement with the coupling means of the hub gear assembly, for example, with a locking pawl 18 shown in dot-dash lines engaging one of the recesses.

The final embodiment of the cylindrical portion 9 exhibited in FIG. 2.5 indicates break-throughs or openings 15 extending through the cylindrical portion 9 in the radial direction from its inner to its outer surfaces. These openings 15 have a certain axial dimension and are spaced apart around the circumference of the cylindrical portion. The openings 15 may be provided in two axially spaced circumferentially extending rows and each is suitable for receiving the tip of a control pawl.

In FIGS. 3.1–3.4 two different arrangements are illustrated for interconnecting the sleeve members 2,3 so that they are reliably engaged against any relative rotation. As distinguished from the arrangements shown in FIGS. 3.1 to 3.4, in FIG. 1, the sleeve members 2, 3 are pressed together. In FIGS. 3.1, 3.2 the drawn-in or inwardly bent end 10 of sleeve member 3 is provided with circumferentially spaced axially projecting rivet pins 20. These rivet pins may be provided as a part of the deep-drawing operation. The cup-shaped sleeve member 2 into which the adjacent end of the sleeve member 3 is fitted, has a plurality of corresponding receiving holes 21 extending in the axial direction and arranged to receive the rivet pins 20. After the sleeve member 3 has been inserted into the cup-shaped sleeve member 2 with its rivet pins 20 extending through the receiving holes 21, the pins are riveted as shown in FIG. 3.2 at 22, so that the sleeve members 2, 3 are securely connected together against any relative displacement in the axial or circumferential directions.

As shown in FIG. 1 with the sleeve member 3 assembled into the sleeve member 2, a significant part of the cup-shaped portion 8 of the sleeve member 2 overlaps the sleeve member 3. Due to the contacting surfaces of the sleeve members 2, 3 it is possible to fasten these members together in the axial direction by means of an adhesive substance. Relative rotation of the sleeve members can be prevented by using axially extending pins, similar to the rivet pins 20 in FIG. 3.1 which fit into corresponding holes comparable to the holes or openings 21.

In FIGS. 3.3, 3.4 another type of connection is shown between the nested sleeve members 2, 3. In this embodiment, note FIG. 3.3, welding projections 23 are formed on the surface of the end face 10 of the sleeve member 3 which fits into the cup-shaped sleeve member 2. These welding projections facilitate a spot-welding connection 24 between the two sleeve members when the sleeve member 3 is seated within the cup-shaped sleeve member 2. The welding connection prevents any relative axial or circumferential displacement of the sleeve members. This type of connection, as shown in FIGS. 3.3 and 3.4 is especially advantages since it can be used without any special openings through the sleeve members for affording the interconnection.

The sleeve members 2, 3 can be produced in a deep drawing operation starting with flat, round sheet metal blanks. Preferably, the deep drawing operation is performed in several stages by means of so-called follow-on or multi-stage operation tools corresponding to the different stages.

With regard to the sleeve member 3, it could also be produced from a tube section by means of chipless deformation.

In FIG. 1 the arrangement of the cup-shaped portion 8 of the sleeve member 2 is shown in more detail. The cup-shaped portion 8 includes an axially extending wall 8a encircling the end 10 of the sleeve member 3 and extending in the axial direction of the hub sleeve. One end of the wall 8a is bent radially inwardly forming a bottom 8b and the radially inner end of the bottom is bent in the axial direction of the hub sleeve and inwardly into the sleeve forming an inner wall 8c spaced radially inwardly from the outer wall 8a. The space between the outer and inner walls 8a, 8c forms the cup-shaped space into which the end 10 of the sleeve member 3 seats. The radially inner surface of the inner wall 8c at the inner edge 16 forms the roller bearing race 6.

From FIG. 1 it can be appreciated that the sleeve member 3 can enclose all the components of a hub gear assembly, particularly the drive and gear assembly elements and there is also the possibility that the brake elements can be enclosed.

The sleeve member 3 can be shaped to adapt to the different types of gear assemblies to be enclosed.

As seen in FIG. 1 the spoke flange 4 on the wheel member 2 is spaced axially from the bottom wall 8b. The spoke flange 5 on the wheel member 3 is located on the opposite end of the cylinder portion 9 from the end which fits into the cup-shaped portion 8 of the wheel member 2. For a short axially extending portion of its length adjacent the spoke flange 5, the cylindrical portion 9 has a slightly larger inside diameter with the inside surface of this increased diameter part forming the roller bearing race 7.

While specific embodiments of the invention have been shown and described in detail to illustrate the application of the inventive principles, it will be understood that the invention may be embodied otherwise without departing from such principles.

What is claimed is:

1. Hub for a bicycle or the like comprising an axially extending hub sleeve body for receiving components used for at least the driving operation, said sleeve body having a first end and a second end spaced apart in the axial direction thereof and, comprising two coaxially arranged and connected sleeve members formed as deep-drawn components and consisting of a first sleeve member and a second sleeve member with each said first and second sleeve member being axially extending and having a first end and a second end, wherein the improvement comprises said first sleeve member having the shape of a cylinder extending approximately for the full axial length of said hub sleeve body from the first end to the second end thereof with the first end of said first sleeve member forming the first end of said hub sleeve body and the second end of said first sleeve member forming in part the second end of said hub sleeve body and being bent radially inwardly transversely of the axial direction of said hub sleeve body, a spoke flange formed on and extending laterally outwardly from said first sleeve member, said second sleeve member being formed cup-shaped at the second end thereof and with the first end thereof located between the first and second ends of said first sleeve member, at least an axially extending portion at the second end of said first sleeve member being fitted into said second sleeve member, the cup-shaped second end of said second sleeve member is bent radially inwardly in overlapping and surface contact with the radially inwardly bent second end of said first sleeve member and said second sleeve member having a spoke flange formed on and extending laterally outwardly therefrom and located between and spaced from the first end and second end of said hub sleeve body.

2. Hub, as set forth in claim 1, wherein said spoke flange on said first sleeve member is located at the first end thereof located remote from the first end of said second sleeve member.

3. Hub, as set forth in claim 2, wherein said first sleeve member has an axially extending end portion adjacent said spoke flange thereon having a larger inside diameter than the remaining axially extending portion of said first sleeve member and said larger diameter portion at the end thereof adjacent the remaining smaller diameter portion forming a roller bearing race.

4. Hub, as set forth in claim 1, wherein said second sleeve member having a radially outwardly directed flange at the first end thereof located outwardly of and encircling said first sleeve member and said first end of said second sleeve member being located between the radially inwardly directed second end of said first sleeve member and said spoke flange on said first sleeve member, and said outwardly directed flange on said second sleeve member forming said spoke flange thereon.

5. Hub, as set forth in claim 4, wherein said second sleeve member having an outer wall extending axially from said spoke flange thereon in the direction away from said spoke flange on said first sleeve member with said inner surface of said outer wall bearing against the circumferential outer surface of said first sleeve member, a bottom wall extending transversely of the axial direction of said hub sleeve body and extending radially inwardly from the end of said outer wall remote from said spoke flange, on said second sleeve member and disposed in surface contact with said inwardly directed second end of said first sleeve member, and an inner wall spaced radially inwardly from said outer wall and extending from the radially inner end of said bottom wall in the axial direction of said hub sleeve body toward the first end of said first sleeve member having said spoke flange thereon, and the radially inner surface of said inner wall spaced axially from said bottom wall forming a roller bearing race.

6. Hub, as set forth in claim 5, wherein said first sleeve member having an axially extending cylindrical portion extending between the first and second ends thereof, and the inner surface of said cylindrical portion having a plurality of circumferentially spaced deformations therein.

7. Hub, as set forth in claim 6, wherein said deformations comprise radially inwardly directed projections.

8. Hub, as set forth in claim 6, wherein said deformations comprise openings extending from the inner surface to the outer surface of said cylindrical portion.

9. Hub, as set forth in claim 1, including means for interconnecting the radially inwardly bent portions of said first and second sleeve members at the second ends thereof for preventing relative axial and circumferential movement therebetween.

10. Hub, as set forth in claim 9, wherein one of said first and second sleeve members having rivet-like projections extending in the axial direction of said hub sleeve body on the end thereof wherein the second end of said first sleeve member fits into the second end of said second sleeve member and the other one of said first and second sleeve members having openings therethrough for receiving said rivet-like pins so that said rivet-like pins can be riveted when said first and second sleeve members are fitted together.

11. Hub, as set forth in claim 9, wherein one of said first and second sleeve members at the second ends thereof where said first sleeve member is fitted into said second sleeve member having a welding projection for welding said first and second sleeve members together when said first and second sleeve members are fitted together.

12. Hub, as set forth in claim 9, wherein the second end of said first sleeve member is pressed into the second end of said second sleeve member and said first and second sleeve members are adhesively interconnected at the seconds ends thereof.

* * * * *